US012492806B2

(12) United States Patent
Beck et al.

(10) Patent No.: US 12,492,806 B2
(45) Date of Patent: *Dec. 9, 2025

(54) SUSPENDED CEILING SYSTEM WITH A LIGHT FIXTURE ASSEMBLY

(71) Applicant: Lucifer Lighting Company, San Antonio, TX (US)

(72) Inventors: Brian Beck, Spring Branch, TX (US); Jack Reilly, San Antonio, TX (US); Nicolas Velasco, San Antonio, TX (US)

(73) Assignee: Lucifer Lighting Company, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/027,937

(22) Filed: Jan. 17, 2025

(65) Prior Publication Data

US 2025/0164098 A1 May 22, 2025

Related U.S. Application Data

(63) Continuation-in-part of application No. 18/738,136, filed on Jun. 10, 2024, now Pat. No. 12,228,264.

(Continued)

(51) Int. Cl.
*F21V 21/04* (2006.01)
*F21S 8/02* (2006.01)
(Continued)

(52) U.S. Cl.
CPC ............ *F21V 21/043* (2013.01); *F21S 8/026* (2013.01); *F21V 21/30* (2013.01); *F21V 23/045* (2013.01);
(Continued)

(58) Field of Classification Search
CPC ...... F21S 8/026; F21V 21/043; F21V 23/001; F21V 23/008
See application file for complete search history.

(56) References Cited

U.S. PATENT DOCUMENTS

2008/0002414 A1* 1/2008 Miletich ................ F21V 19/04 362/382
2012/0044703 A1* 2/2012 Wilson .................... F21V 21/04 362/365

(Continued)

*Primary Examiner* — Christopher E Dunay
(74) *Attorney, Agent, or Firm* — Harness, Dickey & Pierce, P.L.C.

(57) ABSTRACT

A ceiling assembly includes a first cross member, a second cross member spaced apart from and parallel to the first cross member and a plurality of light fixtures. Each light fixture includes an elongated tray comprising a base comprising a first side, a second side and a first opening therethrough. The elongated tray further includes a first longitudinally extending wall extending from the second side of the base and a second longitudinally extending wall extending from the second side of the base. The first longitudinally extending wall has a first coupler. The second longitudinally extending wall has a second coupler. The light fixture assembly has a light assembly and a coupling assembly coupling the light assembly to the tray. The coupling assembly is positioned around the opening and adjacent to the second side around the first opening. A baffle is coupled within the coupling assembly and comprises a lower edge.

20 Claims, 16 Drawing Sheets

Related U.S. Application Data

(60) Provisional application No. 63/521,331, filed on Jun. 15, 2023.

(51) Int. Cl.

| | |
|---|---|
| ***F21V 21/30*** | (2006.01) |
| ***F21V 23/04*** | (2006.01) |
| ***F21V 29/70*** | (2015.01) |
| ***F21V 33/00*** | (2006.01) |
| *F21Y 115/10* | (2016.01) |

(52) U.S. Cl.

CPC .......... *F21V 23/0471* (2013.01); *F21V 29/70* (2015.01); *F21V 33/0076* (2013.01); *F21Y 2115/10* (2016.08)

(56) References Cited

U.S. PATENT DOCUMENTS

| | | | | |
|---|---|---|---|---|
| 2022/0010950 | A1 * | 1/2022 | Miller | F21V 23/023 |
| 2022/0018523 | A1 * | 1/2022 | Vinh | F21V 21/04 |
| 2022/0357003 | A1 * | 11/2022 | Mathews | F21S 8/026 |
| 2023/0045452 | A1 * | 2/2023 | Portinga | F21V 29/76 |
| 2024/0418331 | A1 | 12/2024 | Beck et al. | |

* cited by examiner

SUSPENDED CEILING SYSTEM WITH A LIGHT FIXTURE ASSEMBLY

CROSS-REFERENCE TO RELATED APPLICATIONS

This application is a continuation-in-part of Ser. No. 18/738,136 filed on Jun. 10, 2024. This application claims the benefit of U.S. Provisional Application No. 63/521,331, filed on Jun. 15, 2023. The entire disclosures of the above application are incorporated herein by reference.

FIELD

The present disclosure relates generally to a suspended ceiling system and, more particularly, to a lighting system that couples to a suspended ceiling system.

BACKGROUND

This section provides background information related to the present disclosure which is not necessarily prior art.

Suspended ceilings are used in many locations. Providing a convenient lighting source for a suspended ceiling is important. Also, providing a clean aesthetic for a light assembly is also important. For suspended ceilings, lighting is typically assembled on site. Electricians and other trades-man spend a lot of time in the assembly of a ceiling and a light fixture. Junction boxes, network interfaces and other devices are typically individually assembled. This increases the overall cost of the project.

SUMMARY

This section provides a general summary of the disclosure and is not a comprehensive disclosure of its full scope or all of its features.

The present disclosure provides a light fixture assembly that allows connection of the fixture directly to a ceiling system. The present system has a controlled fit and finish which is better than individually installed components. The system may also be conveniently scaled for providing various numbers of light assemblies.

In one aspect of the disclosure, a light fixture assembly includes an elongated tray comprising a base comprising a first side, a second side and a first opening therethrough. The elongated tray further includes a first longitudinally extending wall extending from the second side of the base and a second longitudinally extending wall extending from the second side of the base. The first longitudinally extending wall has a first coupler. The second longitudinally extending wall has a second coupler. The light fixture assembly has a light assembly and a coupling assembly coupling the light assembly to the tray. The coupling assembly is positioned around the opening and adjacent to the second side around the first opening. A baffle is coupled within the coupling assembly and comprises a lower edge coplanar and flush with the base.

In another aspect of the disclosure, a ceiling assembly includes a first cross member, a second cross member spaced apart from and parallel to the first cross member and a plurality of light fixtures. Each light fixture comprising a first elongated tray comprising a base comprising a first side, a second side and a first opening therethrough. The elongated tray further includes a first longitudinally extending wall extending from the second side of the base and a second longitudinally extending wall extending from the second side of the base. The first longitudinally extending wall has a first coupler. The second longitudinally extending wall has a second coupler. The light fixture assembly has a light assembly and a coupling assembly coupling the light assembly to the tray. The coupling assembly is positioned around the opening and adjacent to the second side around the first opening. A baffle is coupled within the coupling assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
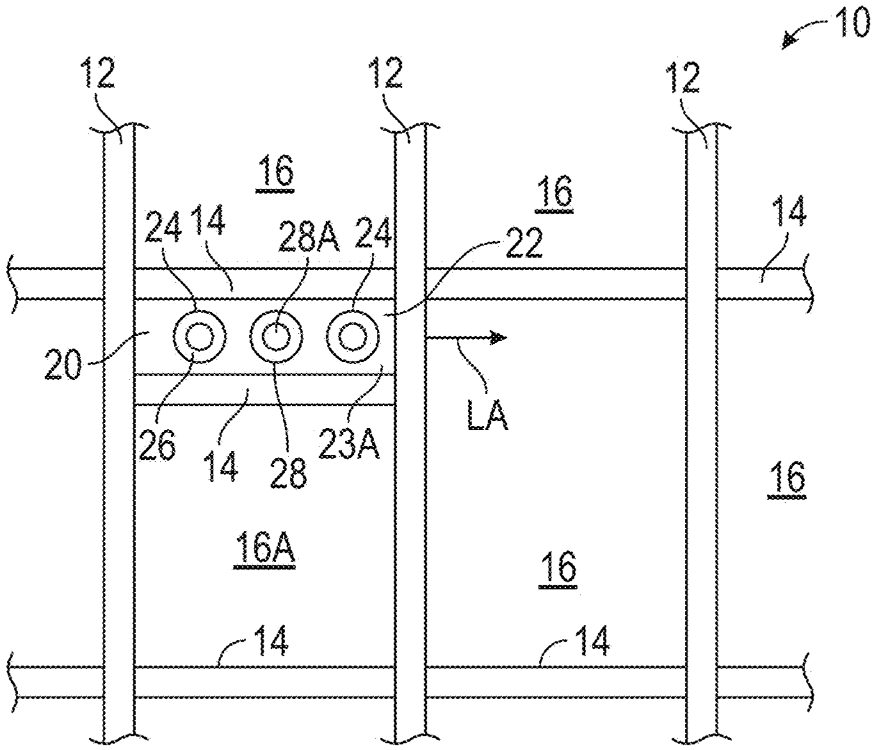
FIG. 1A is an underside (finished side) view of a ceiling system.

Referring now to FIG. 1A, an upward view of a ceiling system 10 is set forth. The ceiling system 10 has a plurality of members 12 that are parallel to each other and spaced apart from each other. The members 12 have cross members 14 disposed therebetween. The members 12 and cross members 14 are suspended below a building structure by wires (not shown). The cross members 14 are used to support ceiling tiles 16. A longitudinally shortened ceiling tile 16A is illustrated adjacent to a light fixture assembly 20. The light fixture assembly 20 is supported by two spaced apart cross members 14. The light fixture assembly 20 has a tray 22 that is finished in a finished material such as painting to provide an aesthetically pleasing surface. A longitudinal axis LA of the light fixture assembly 20 is illustrated.

Figure 1B:
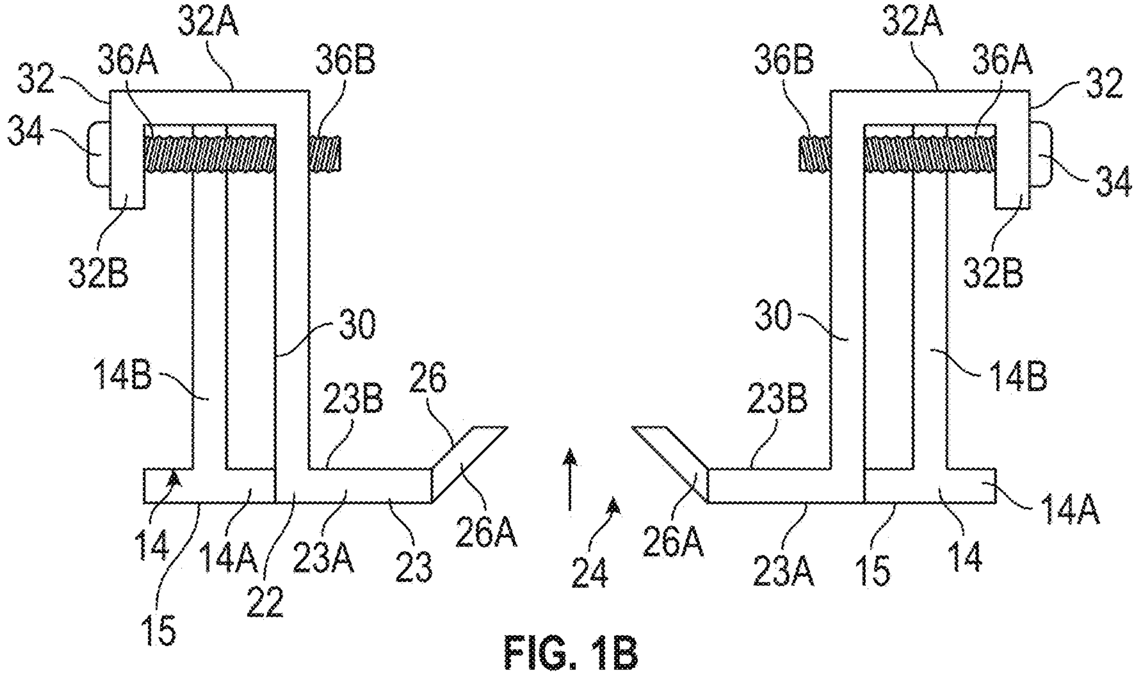
FIG. 1B is a cross-sectional view of the couplers for coupling the light fixture assembly to the cross members.

Referring now also to FIG. 1B, the elongated tray 22 has a planar base 23 with at least one opening 24 that is used to receive a baffle 26. The base 23 has a first side 23A and a second side 23B. In the present example, two openings 24 are provided. However, one opening or more than two openings 24 may be provided in a light fixture assembly 20. The cross members 14 have a planar member 14A and an upright member 14B. The planar member 14A has a surface 15 that may be coplanar with the first side 23A of the of the base 23. In FIG. 1B the surface 15 and the side 23A are also flush. Coplanar and/or flush makes the system the aesthetics of the system increase. The planar member 14A and the upright member 14B may be perpendicular as illustrated in the present example. They may be referred to as a tee support. The planar member 14A may be coplanar and flush with the tray 22 and the downward-facing or lowermost edge 26A of the baffle 26. This feature is described in greater detail below.

Another opening 28 may be formed in the base 23. Although the opening 28 is illustrated between two openings 24, the opening 28 may be located in various locations on the base 23. The opening 28 may be many sizes and shapes although round may be common. The opening 28 may be sized to have a component 28A therein or therethrough. The component 28A may be a sensor or another type of component such as but not limited to a wireless node, a smoke detector, fire detector, a gas sensor, a humidity sensor, an occupancy sensor, a light sensor and a temperature sensor.

The tray 22 has two longitudinally extending walls 30 that extend from the second side 23B of the base 23. The longitudinally walls 30 are coupled to the cross members 14 at a coupler 32. In this example, the four couplers 32 comprise a first wall 32A that extends outward or perpendicular, in this example, from the longitudinally extending walls 30. A second wall 32B extends outward or perpendicular in this example from the first wall 32A. In this example, the second wall 32B is parallel to the longitudinally extending wall 30. However, different angles may be set forth. In general, the longitudinally extending wall 30, the first wall 32A and the second wall 32B form a U-shaped channel. In the present example, the first wall 32A is positioned adjacent to the upright member 14B so that the entire tray 22 is supported between the two cross members 14.

A fastener 34 may extend into the second wall 32B through the upright member 14B of the cross member 14 and into the longitudinally extending wall 30. The fastener 34 may be one of a variety of types of fasteners including a nail, a bolt, a rivet or the like. The fastener 34 may be disposed within a fastener opening 36A in the second wall 32B and a fastener opening 36B within the longitudinally extending wall 30. The fastener 34 may be removable.

Figure 2A:
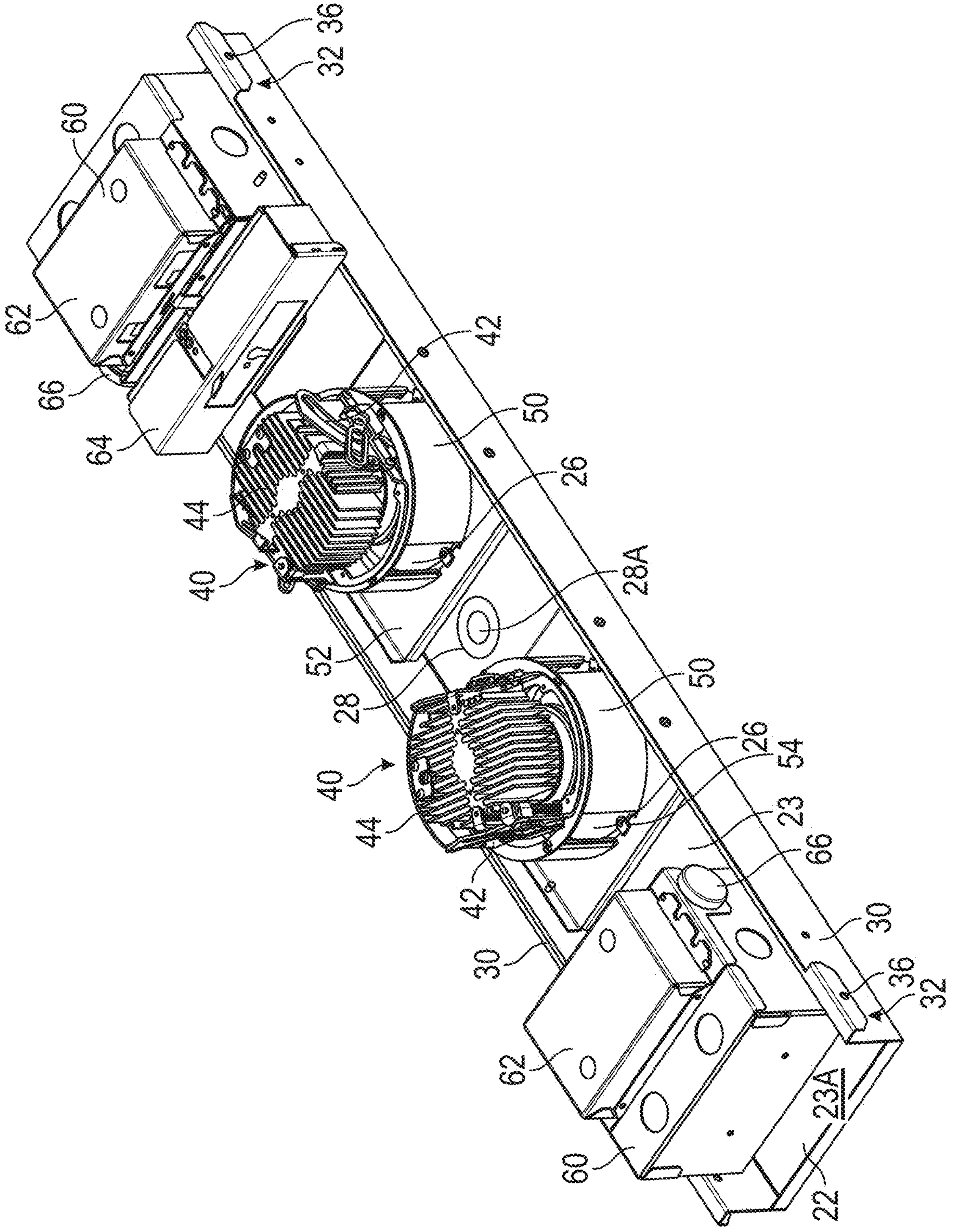
FIG. 2A is a top perspective view of the light fixture assembly having a shunt, junction box and driver box.
Figure 2B:
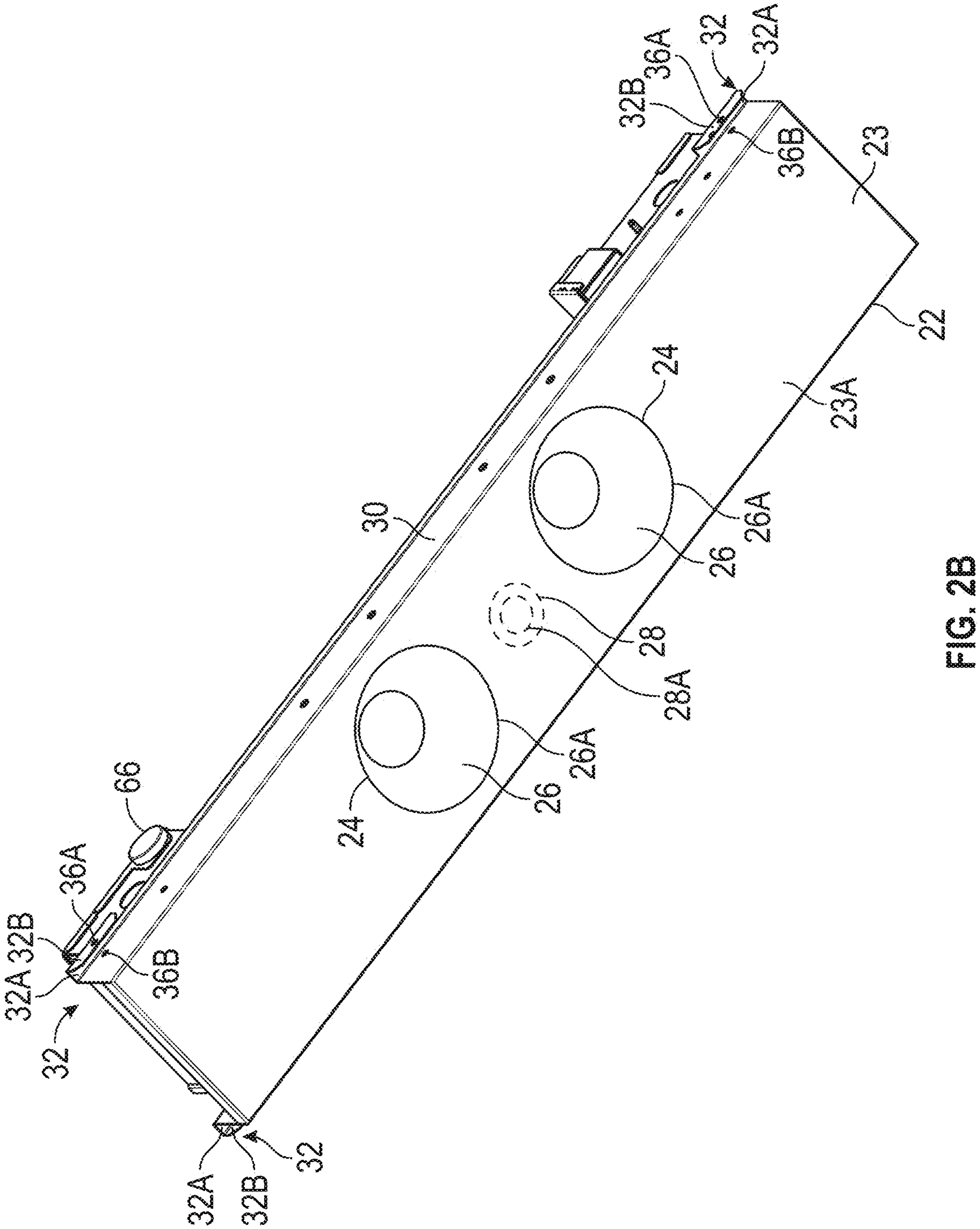
FIG. 2B is a bottom view or finished view of the light fixture assembly.

Referring now to FIGS. 2A and 2B, the inside and the underside of the light fixture assembly 20 is set forth. The light fixture assembly 20 has two light assemblies 40 in this example. However, various numbers of light assemblies 40 may be provided. The light assembly 40 has a coupling mechanism 42 that is used for coupling a heat sink 44 and the other lighting components to the tray 22 as will be described in greater detail below. The coupling mechanism 42 is positioned adjacent a support 50. The support 50 is sized so that the lighting components and the baffle 26 are accommodated therein. A clamp 52 is positioned adjacent to a trim piece 54. The support 50, the clamp 52 and the trim piece 54 are described in greater detail below. In another example, the couplers 32 may extend longitudinally along most of the longitudinally extending wall 30 so only two are required.

The tray 22 may also have one or more junction boxes 60 coupled thereto. In this example, two junction boxes 60 are coupled to the tray 22. The junction boxes 60 are used for making an electrical connection to the building. Wires from the building are received therein.

A driver box 62 is also coupled to the tray 22. In this example, the driver box 62 is mechanically coupled to the tray 22 through the junction box 60. The driver box 62 is used to house a driver for driving the light emitting diodes of the light assembly 40. Electrical connections are made between the driver in the driver box 62 and the wires in the junction box 60.

A shunt 64 may also be coupled to the tray 22. The shunt 64 may be coupled directly to the tray or to the junction box 60. The shunt 64 is described in greater detail below. The shunt 64 allows the power supplied to the light assembly 40 to be switched to a backup power source such as a battery or another alternate source such as generator power.

A wireless node or network interface 66 may act as a controller for controlling the various aspects of the light fixture assembly 20. That is, the network interface 66 may also act together with a controller for turning on and off one or both of the lights or dimming the lights in the light fixture assembly 20. It should be noted that both junction boxes 60 may include the network interface 66. One example of a network interface is an ATHENA®.

Figure 3:
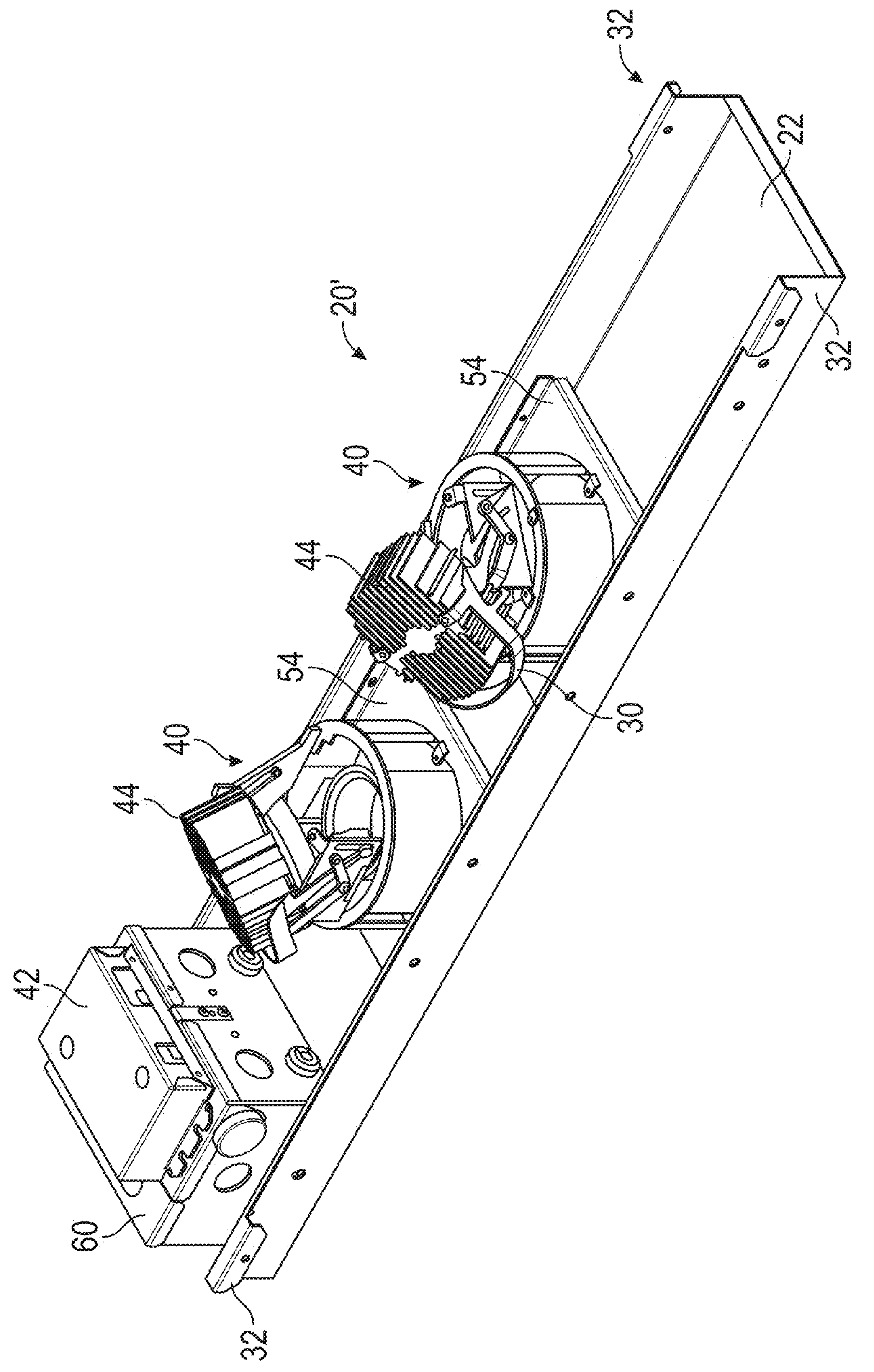
FIG. 3 is a perspective view of a light fixture assembly having a single junction box.

Referring now to FIG. 3, a similar example of a light fixture assembly 20' to that illustrated in FIGS. 2A and 2B is set forth. In this example, the tray 22 includes a single junction box 60 and a single driver box 62. Of course, a shunt box 64 may also be coupled to the tray 22.

Figure 4:
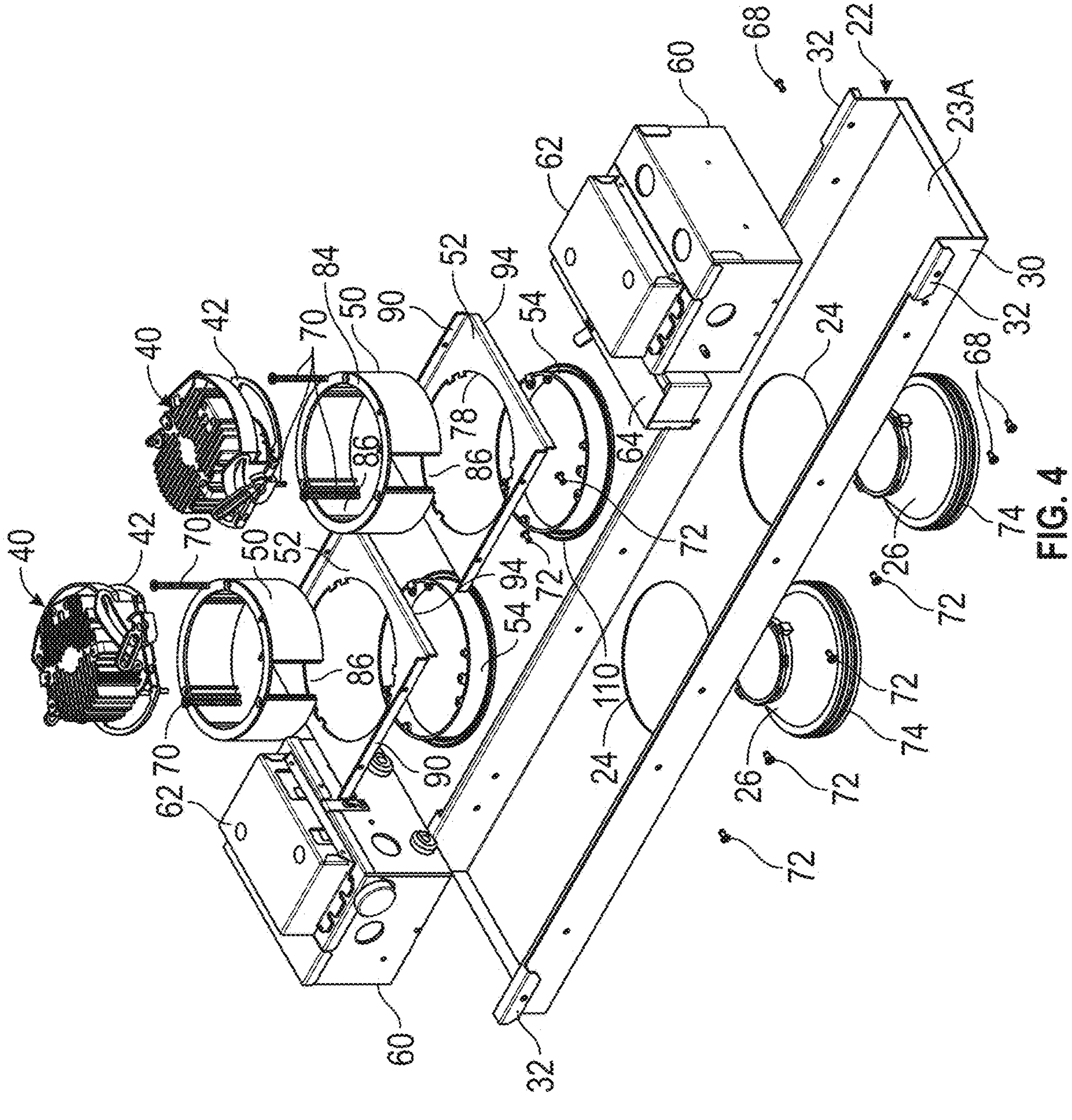
FIG. 4 is a partially exploded view of the light fixture assembly of FIG. 2A.

Referring now to FIG. 4, a partial exploded view of the light fixture assembly is set forth. The junction boxes 60 may be secured to the tray 22 and, in particular, to the longitudinally extending wall 30 by fasteners 68. The fasteners 68 may be rivets, screws bolts or the like.

In FIG. 4, the relative position of the light assembly 40, the clamp 52, the trim piece 54 and the support 50 are illustrated. The support 50 is coupled to the trim piece 54 using fasteners 70.

The clamp 52 is also fastened to the longitudinally extending walls by fasteners 72. The fasteners 72 may be screws, rivets, bolts or the like.

The baffles 26 have a seal 74 that is used for providing a friction fit and coupling the baffle to the trim piece 54.

Figure 5A:
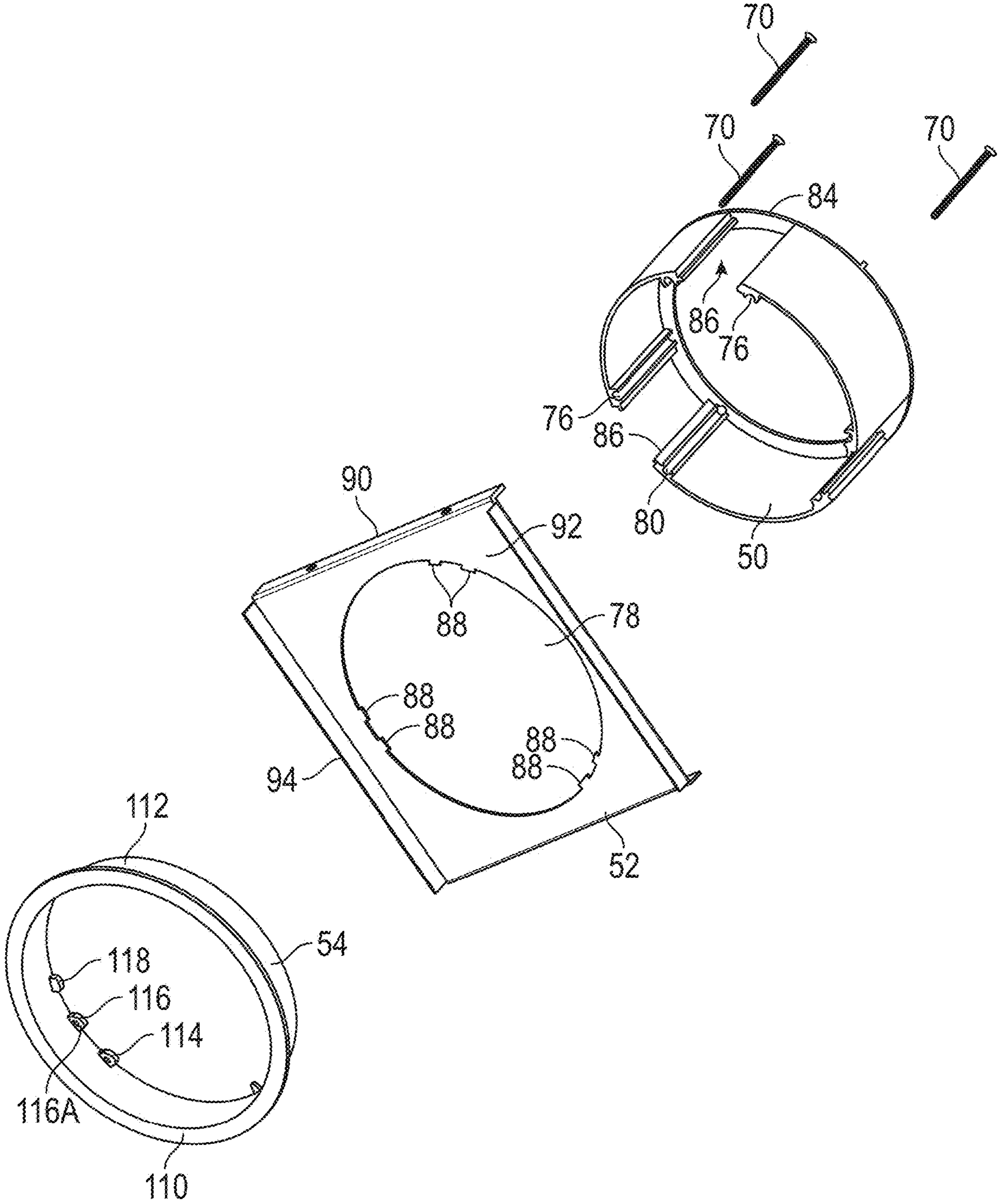
FIG. 5A is an exploded underside view of the support, clamp and trim piece.
Figure 5B:
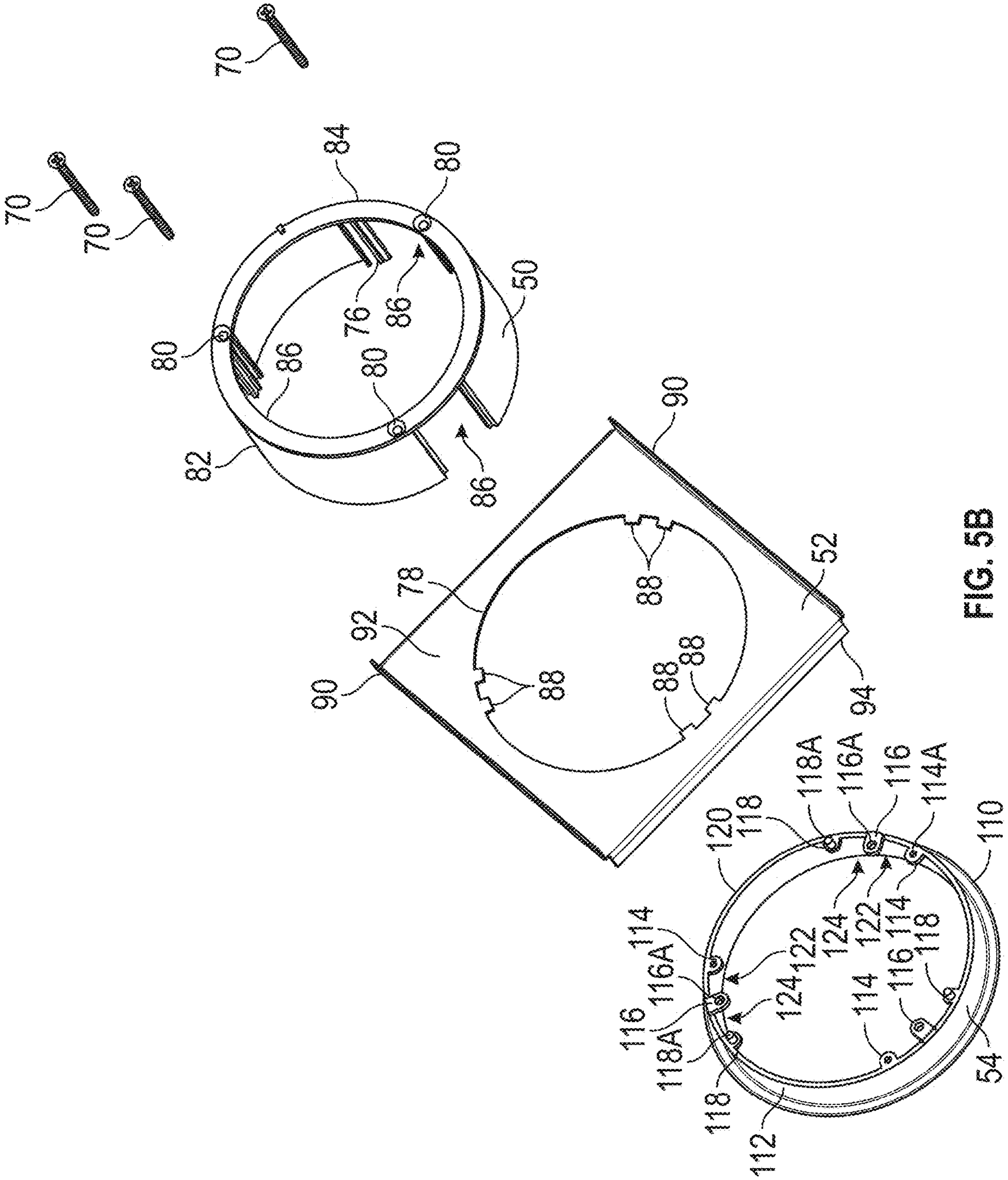
FIG. 5B is an exploded top view of the support, clamp and trim piece.
Figure 5C:
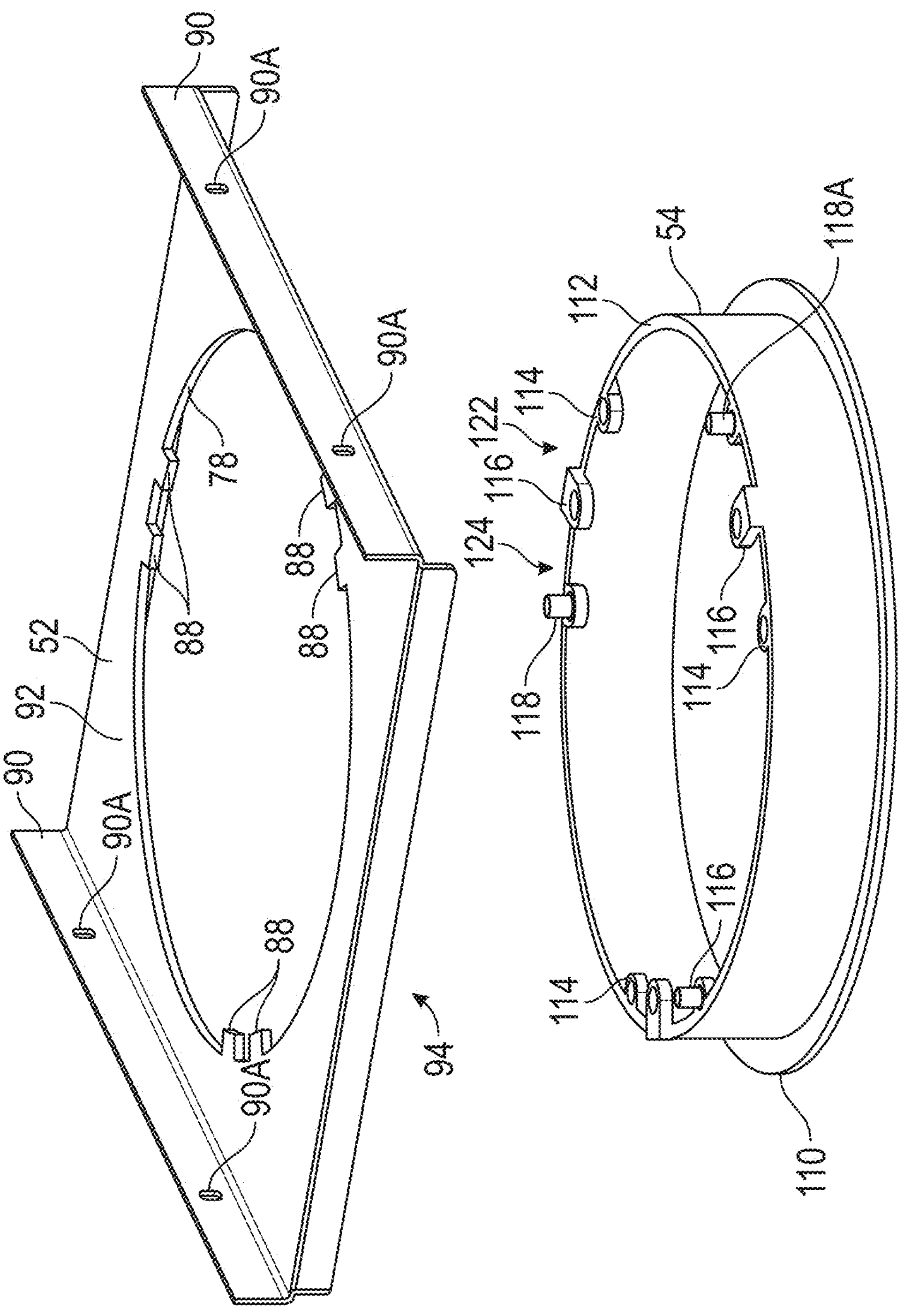
FIG. 5C is an exploded perspective view of the trim piece and the clamp.

Referring now also to FIGS. 5A-5C, details of the support 50, clamp 52 and trim piece are set forth. FIG. 5A illustrates the relative position of the trim piece 54, the clamp 52 and the support 50 from the bottom perspective. FIG. 5B shows these components from the top perspective. Likewise, FIG. 5C shows the clamp 52 and the trim piece 54 from the top perspective. When assembled, the trim piece 54 is sized to be received within the openings 78 of the clamp 52. The fasteners 70 are received within channels 80 that are formed in an outer wall 82 of the support 50. An upper ring 84 extends around the support 50. The outer wall 82 is discontinuous in that a space 86, in three locations in this example, is disposed between different portions of the outer wall 82.

The clamp 52 has tabs 88 that align with the space 86 when assembled. In this example, two tabs 88 are positioned within each of the spaces 86. Although two tabs 88 are illustrated, one tab 88 or more than two tabs 88 may be provided.

The clamp 52 has a pair of flanges 90 that extend from a planar surface 92. The flanges 90 have openings 90A that are used for receiving the fasteners 72 as mentioned above. The flange 90, in this example, extends on a plane that is normal to or perpendicular to the planar surface 92.

The planar surface 92 also has flanges 94 in the opposite direction as the flanges 90. The flanges 94 may be sized to accommodate the trim piece 54 between the planar surface 92 and the base 23 of the tray 22. The flange 94, in this example, is perpendicular to the planar surface 92 in the opposite direction as the flange 90.

The trim piece 54, in this example, is formed as a ring. The trim piece 54 has a flange 110 that, when assembled, is positioned against the second side of the base 23 of the tray 22. The trim piece 54 has an outer wall 112. The outer wall 112 extends in a direction perpendicular to the flange 110. The outer wall 112, in this example, is a cylindrical wall.

In this example, the outer wall 112 has a plurality of extensions radially extending inward therefrom. The extensions 114 and 118 are used to support the support 50. The extension 114 has an opening 114A extending therethrough. The opening 114A is sized to receive the fastener 70 that extends through the channels 80 in the outer wall 82 of the support 50. The extension 118 has a pin 118A that extends in an axial direction toward the support 50. The pin 118A is received within a support groove 76 of the support 50. The extensions 114 and 118 have a surface that is flush with a top edge 120 of the trim piece 54. The top edge 120 is directly adjacent to the outer wall 82. The extension 116 has an opening 116A. A space 122 is disposed between the extension 114 and 116. The space 122 is sized to receive one of the tabs 88. Likewise, a space 124 is disposed between extensions 116 and 118 and is sized to receive one of the tabs 88.

During assembly, the clamp 52 is positioned so that tabs 88 align with the spaces 122, 124. The spaces 86 are positioned so that the channels 80 align with the openings 114A so that the fastener engages the opening 114A. The height of the extension 116 prevents the tabs 88 from rotating during assembly. The pin 118A aligns with the support groove 76 to prevent the support from rotating. The extension 116 may be used for various coupling purposes.

Referring now to FIGS. 6A, 6B, 6C and 6D, the light assembly 40 relative to the support 50, the clamp 52 and the trim piece 54 is set forth. As can be seen best in FIG. 6A, the fasteners 72 extend through the longitudinally extending walls 30 so that the trim piece 54 is maintained in position. Because the support 50 is coupled to the trim piece 54, a coupling assembly 126 of the support 50, the clamp 52 and the trim piece 54 is formed. The coupling assembly 126 couples the light assembly 40 to the tray 22. The coupling assembly 126 is coupled to the tray 22 at the longitudinally extending walls 30. The coupling assembly 126 receives the baffle 26 which is removably coupled therein.

The baffle 26 may have a lens 130 that is retained to the baffle 26 by a lens retainer 132. One or more fasteners 134 may be used to hold the retainer 132 to the baffle 26 so the lens 130 is disposed therebetween.

A LED assembly 140 is spaced apart from an optically positioned adjacent to the lens 130. In a ray of LEDs 142 is positioned within the LED assembly 140. An optic 144 may be positioned at the optical outlet of the LED assembly 140 to direct light through the lens 130. The LED assembly 140 is thermally coupled to the heat sink 44. The LED assembly 140 and the heat sink 44 are coupled to the coupling mechanism 42. Arms 42A and 42B have guides 150A and 1500B that are used to guide the rotation of the heat sink 44 and the LED assembly 140 relative to the tray 22, baffle 26 and the lens 130. As mentioned above, the configuration of the coupling mechanism 42 may vary depending upon the various light conditions. Likewise, the baffle 26 and the corresponding opening 24 may also vary in size and shape. For example, although a round baffle and round shape is illustrated for all the components, square or rectangular baffles 26 may be used.

Figure 6A:
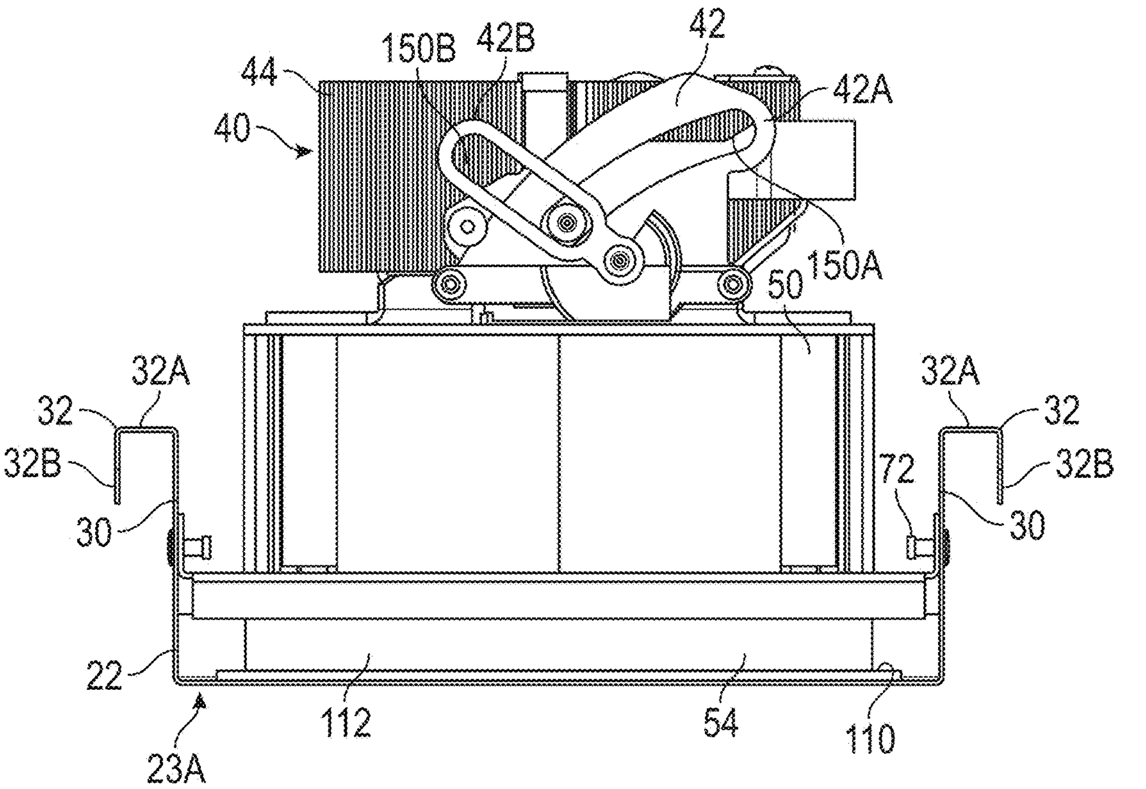
FIG. 6A is a side view of the light assembly relative to the trim piece, clamp and support in an assembled and non-tilted position.
Figure 6B:
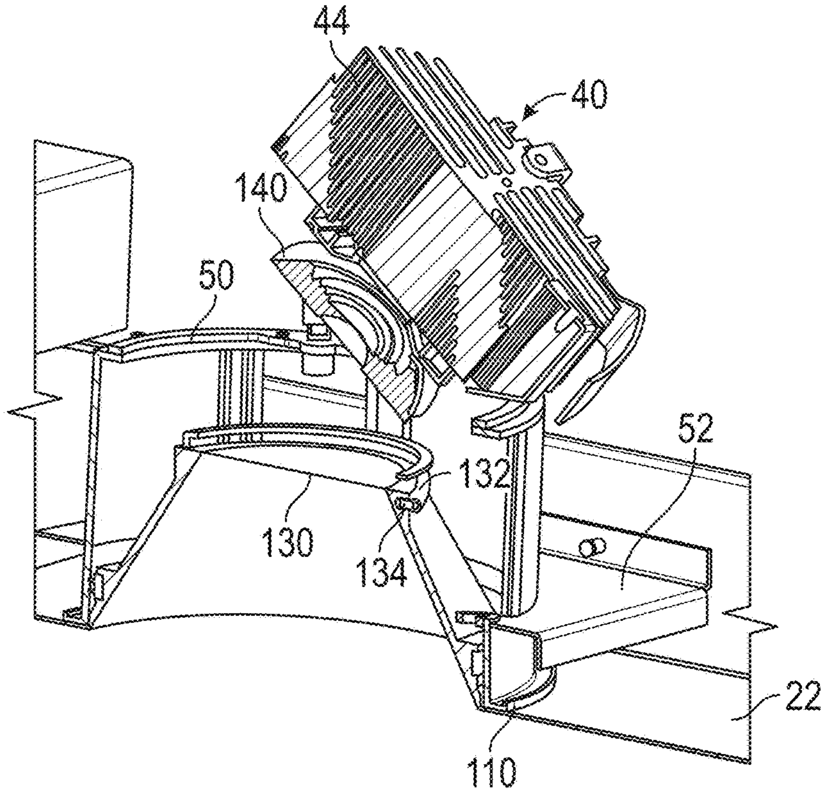
FIG. 6B is a perspective view of the light assembly with the coupling mechanism in a tilted position.
Figure 6C:
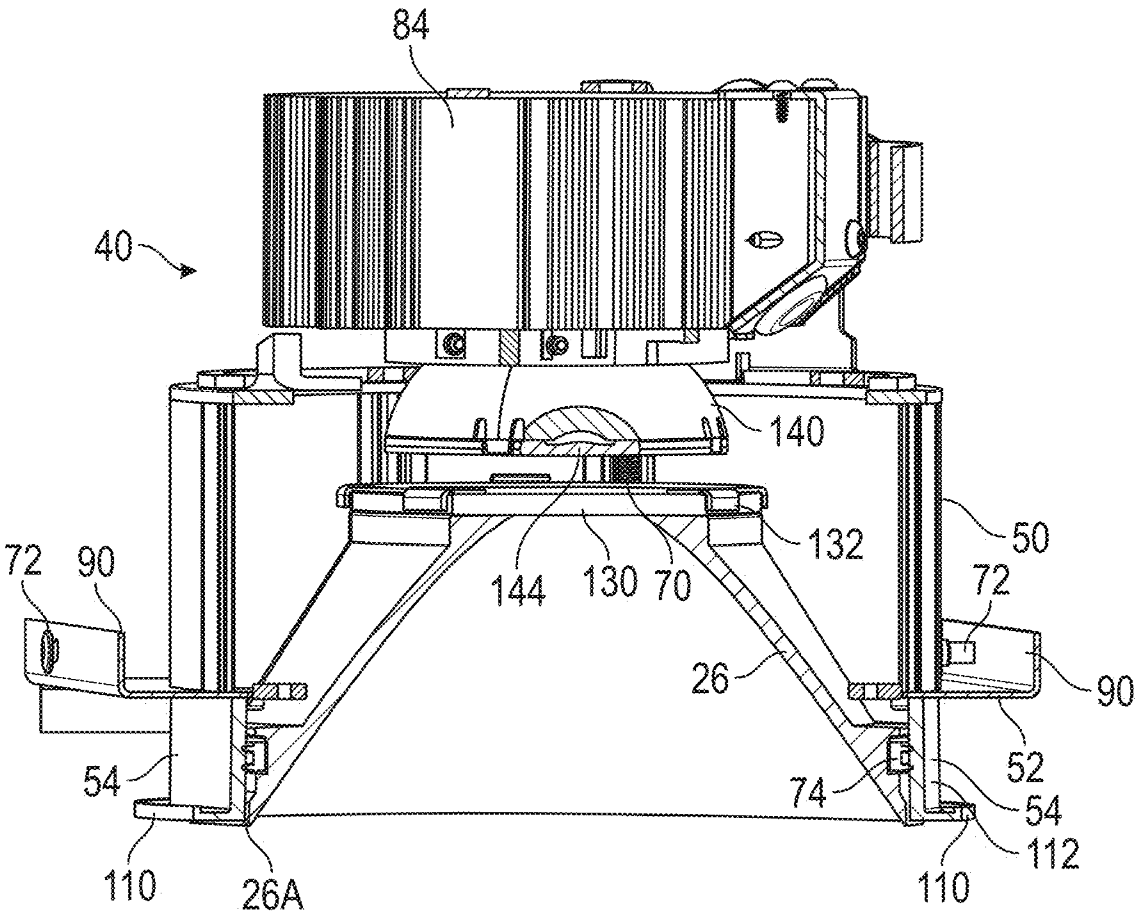
FIG. 6C is a cross-sectional view of the light assembly relative to the support, clamp, trim piece, lens and baffle.
Figure 6D:
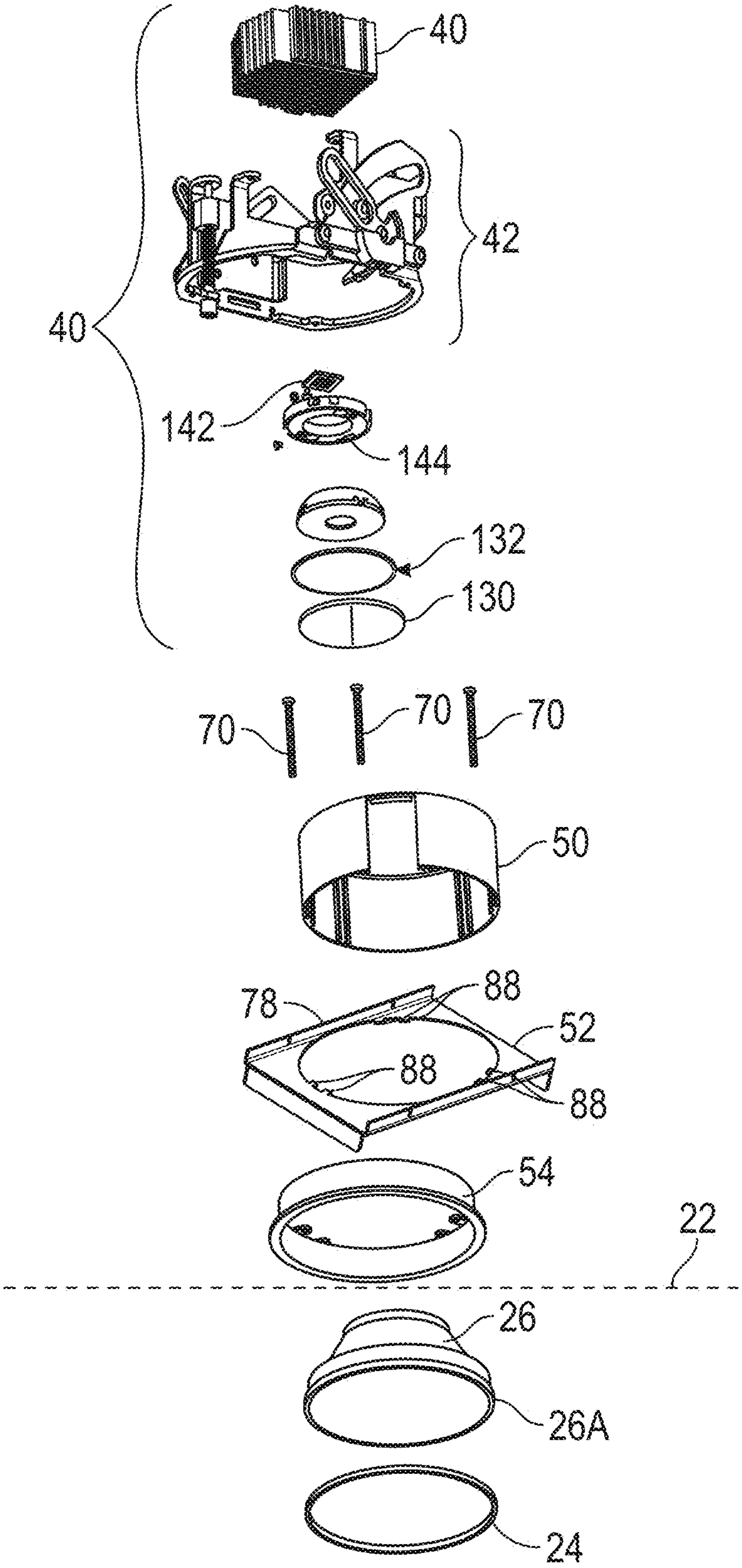
FIG. 6D is an exploded view of the light fixture assembly without the tray.
Figure 6E:
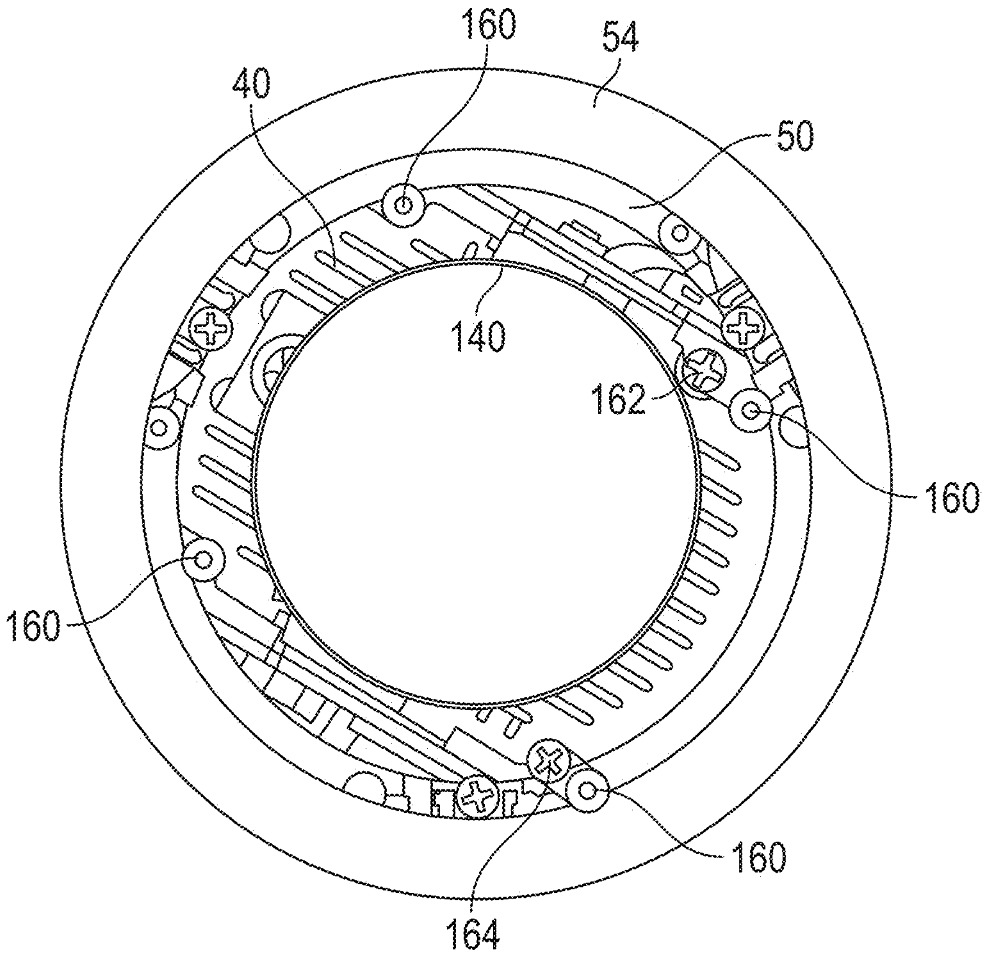
FIG. 6E is a bottom view of the light assembly with the baffle removed.

Referring not to FIG. 6E, a view into the light fixture assembly 20 is set forth. In this example, fasteners 160 couple the coupling mechanism 42 to the support 50. In this example, four screws are used as the fasteners 160. The coupling mechanism 42 may be tilted by rotating the tilt screw 162 and rotated using a rotation screw 164. In this manner, the angle and rotation of the light direction may be set.

Figure 7:
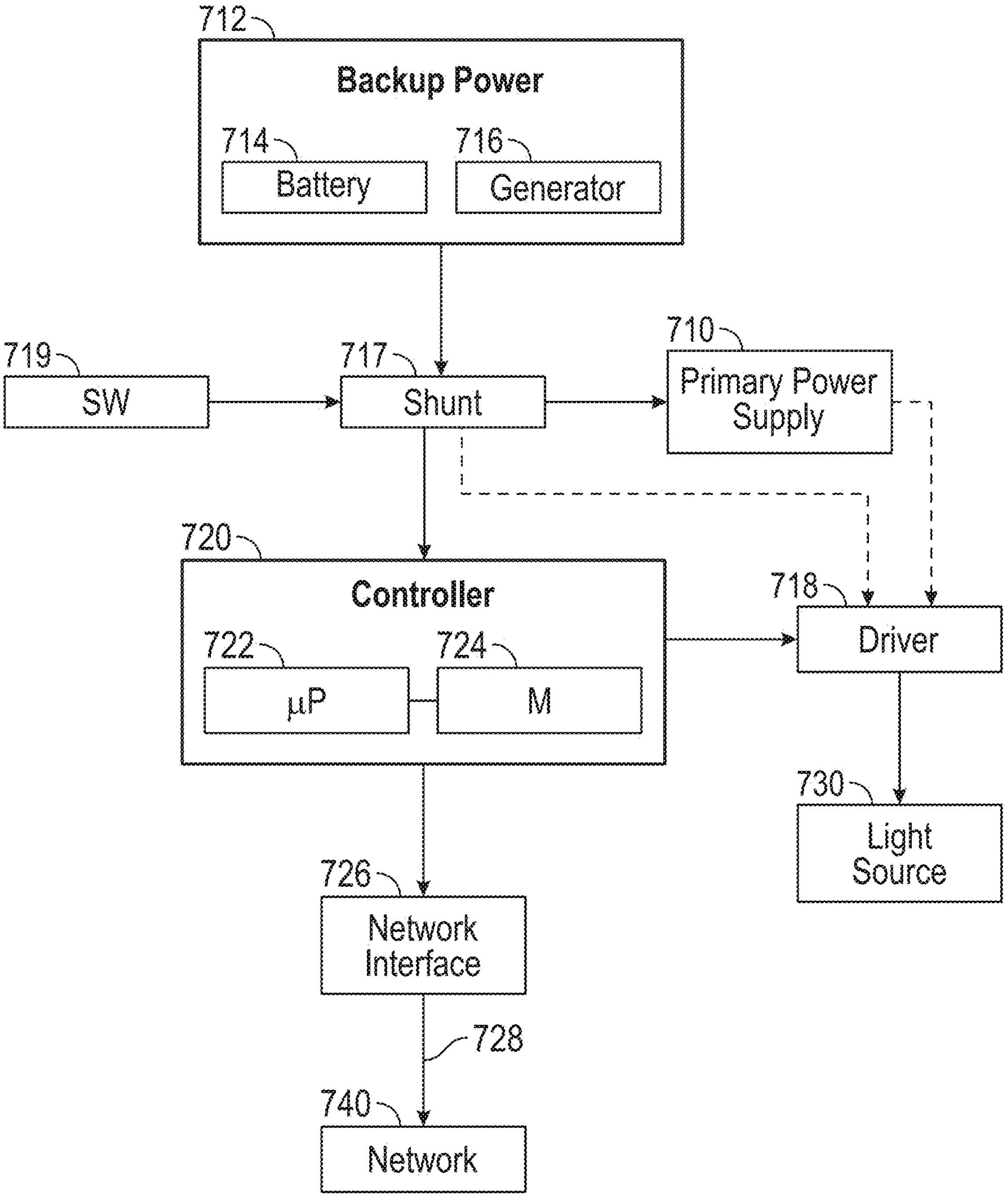
FIG. 7 is a block diagrammatic view of the circuitry of the light fixture assembly.

Referring now to FIG. 7, a block diagrammatic view of a schematic of the system is set forth. In this example, a primary power supply 710 such as a building voltage, such as 110V, is set forth. The primary power supply 710 may be an AC power supply.

A backup power supply 712 is an optical feature and is illustrated in FIG. 7. The backup power supply may be a battery 714, a generator 716 or the like. The backup power supply may be either AC or DC. The backup power supply 712 and the primary power supply 710 may be coupled to a driver 718 directly or through a controller 720. The controller 720 has a microprocessor 722 and a memory 724 that is a non-transitory computer-readable medium that includes machine readable instructions that are executable by the processor 722. The controller 720 may communicate with a network interface 726 through an antenna 728. The antenna 728 communicates control signals to and from a network 740.

The driver 718 is used to drive the light source 730. The light source 730, as described above, may be the LED assembly 140 that has an array of LEDs 142. In the simplest version, the primary power supply 710 may be directly coupled to the driver 718. In more complex versions using the shunt 717, either the backup power supply 712 or the primary power supply 710 may be communicated to either the controller 720 or the driver 718. The shunt 717 may have switch 719 for activating the shunt to switch between the primary power supply and the or the backup power supply. The switch 719 may also be used for testing the shunt.

In operating, the installation of the light fixture assembly to the suspended ceiling system 10 is made to be relatively quick and simple by the integrated couplers. All the components for quick assembly may be provided. For servicing, an adjacent tile of the suspended ceiling may be moved to access the components to be replaced. However, servicing may also take place by removing the baffle. The shunt can be reached by removing the light assembly and reaching through the opening 24.

Figure 8A:
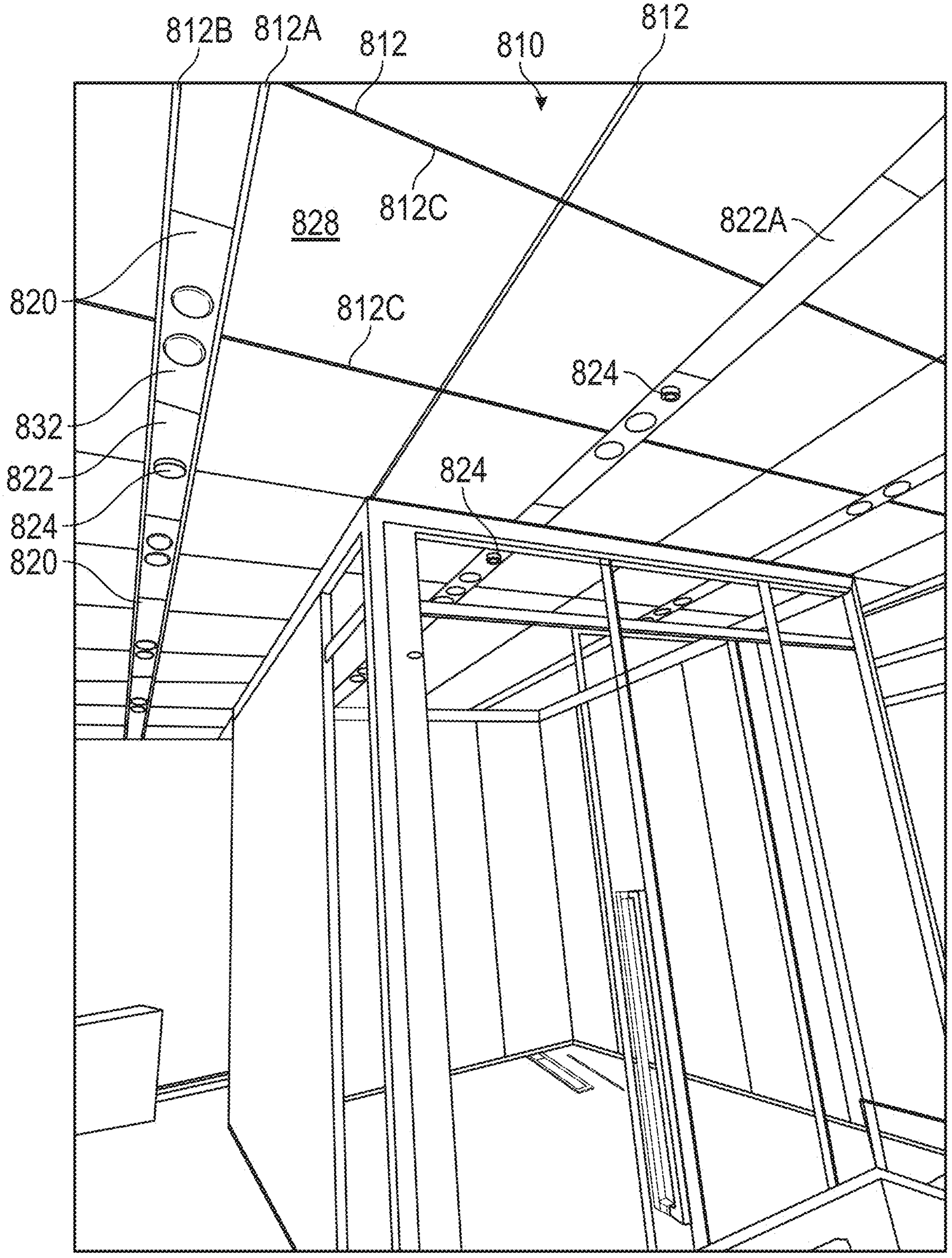
FIG. 8A is a perspective view of a ceiling assembly in a room.

Referring now to FIG. 8A, a ceiling system 810 is illustrated. In this example, a plurality of grid cross members 812 is illustrated. In this example, grid cross members 812A and 812B are disposed parallel to each other and are used to support light fixture assemblies 820 therebetween. Other grid cross members 812 like grid cross members 812C are perpendicular to grid cross member 812A and 812B and may or may not extend between the two parallel cross members supporting the light fixture assemblies 8120. In addition, panels 822 may be disposed between various light fixture assemblies 820. Panels 822 may be filler or blank panels as illustrated at 822A or may include a component 824. As mentioned above, the light fixture assemblies 820 may also include a component 824. The lengths of the light fixture assemblies 820 and the panels 822 may vary depending on design configurations and requirements. As will be described in greater detail, the light fixture assemblies 820 and the panels 822 may be flush and coplanar to provide a smooth uninterrupted design aesthetic.

Ceiling tiles 828 are suspended by one or more cross members 812, 812A, 812B and 812C. In this example, ceiling tiles 828 may be generally uniform in size. The bottom surface of the ceiling tiles may be coplanar with the first side of the base 832 of the light fixture assembly and also with the panel 822.

Figure 8B:
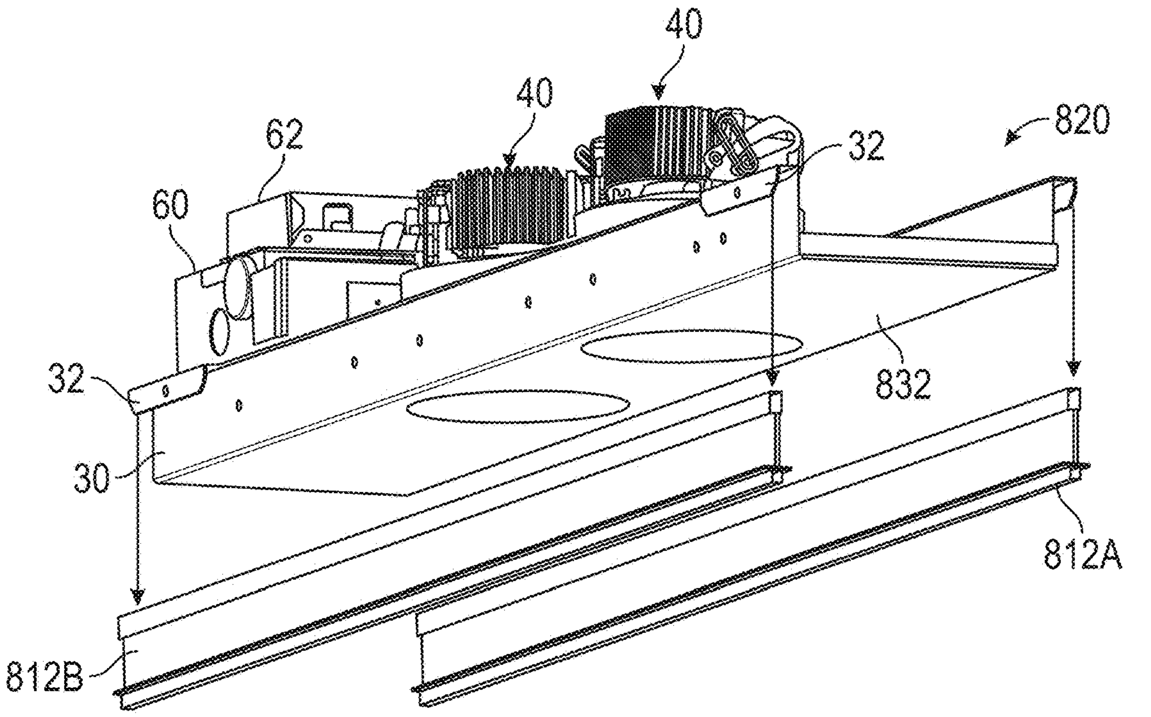
FIG. 8B is an enlarged perspective view of grid members exploded away from a light fixture assembly.

Referring now also to FIG. 8B, the details of the members 812A and 812B relative to the light fixture assemblies 820 is illustrated. The grid cross-members 812A and 812B have a lower surface 830A and 830B. The lower surface, in the example, is coplanar with the surface 832A of the light fixture assembly 820. Also, as illustrated in FIG. 8C, the lower surface 828A of the ceiling tiles 828 may be configured to coplanar with lower surfaces 830A, 830B of the grid cross members 812A, 812B and the surface 832A of the base 832 of the light fixture assembly 820.

The present system enables the preassembled light fixture assembly to be positioned efficiently in place during the configuration and building out of a room area. The light fixture assemblies 820 and the lower surface 832A thereof may be painted in a particular shade and or texture to match the surrounding ceiling tiles 828. To assemble the light fixture assemblies 820 in place, an electrician merely has to connect the wires to the light fixture assembly rather than the typically cumbersome and time consuming method for cutting holes in ceiling tiles and inserting the light portions therein.

Figure 8C:
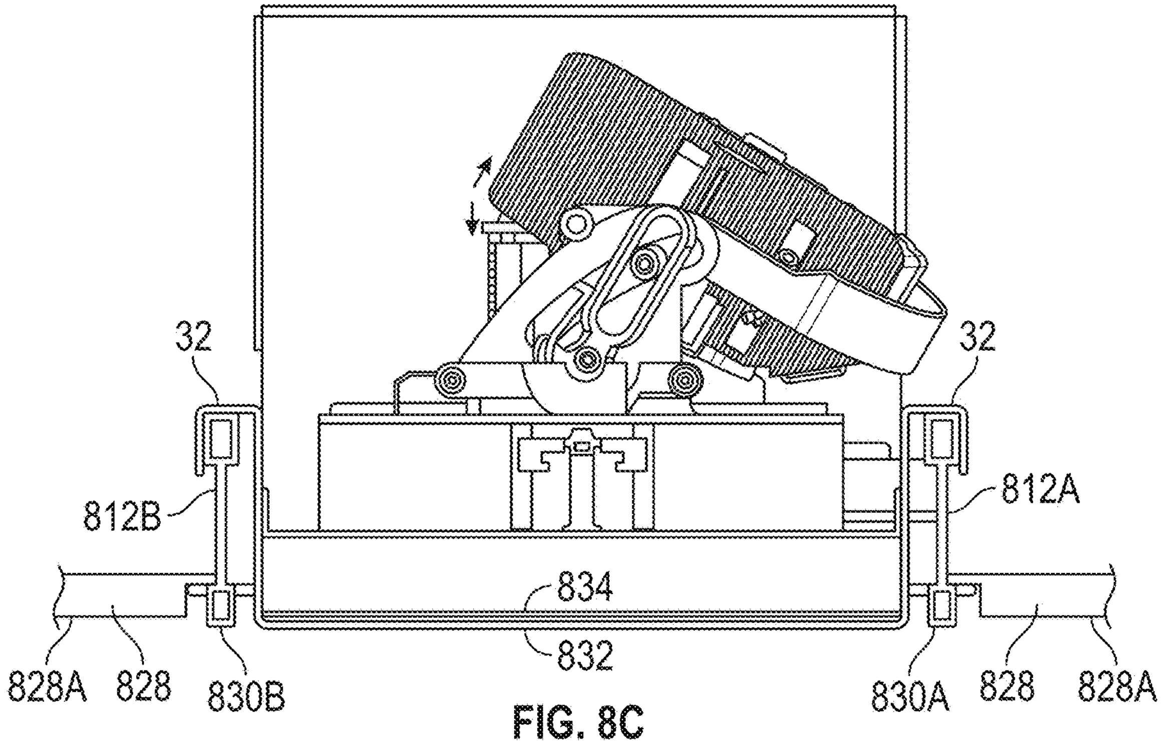
FIG. 8C is a side view a light fixture assembly illustrated fastened to grid members.
Figure 9:
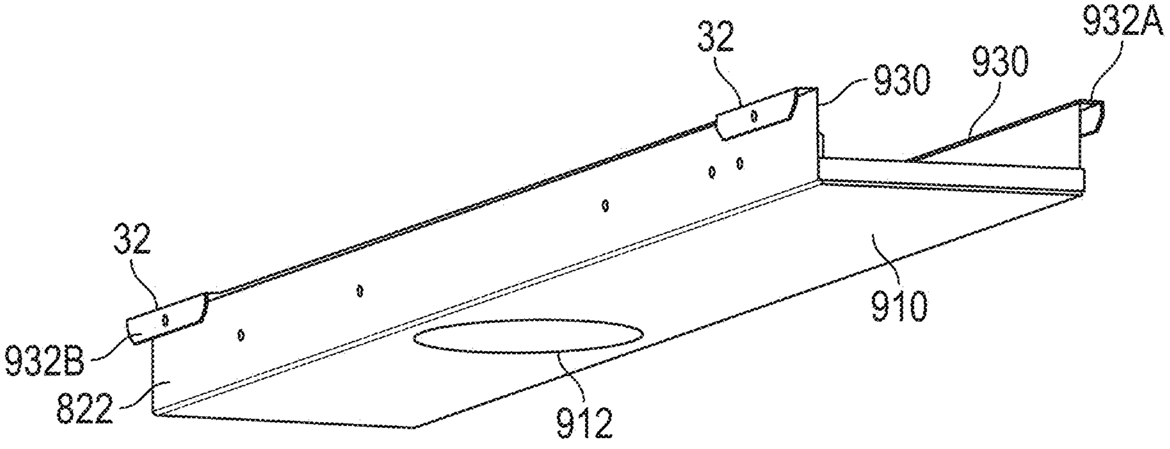
FIG. 9 is a perspective view of a panel according to the present disclosure.

Referring now to FIG. 8C, the panel 822 is illustrated in further detail. In this example, the panel 822 may be configured in a similar manner to the panels illustrated above without the light assemblies therein. In this example, the panel 822 has a base 910 with the couplers 932 that extend from the base 910 in a vertical direction. The configuration of the couplers 932 may have a first wall 932A that, in this example, extends horizontally from a side wall 930 when assembled. A second wall 932B extends parallel to the longitudinally and vertically extending walls 930 extending from the second side of the base 910. The panel 822 may be a blank panel or have various components 28A therein. The panel 822 may be held or suspended by the members 812A and 812B. However, as mentioned above, several types of components 28A (shown in FIG. 1A) may be disposed within an opening 912. The size, shape and number of the openings 912 may vary depending on the component characteristics and the desired number of components. The position of the components 28A may vary laterally and longitudinally within the panel 822. The panel 822 ma also be used to support a pendulum light fixture.

By providing the light assemblies with preinstalled light fixtures therein, the look provides a sculptural cavity that is continuous with the ceiling opening from which light emanates. The custom look is not achievable without preinstalling the light fixture in the panel without extremely labor which is extremely expensive to perform at a job site. The field installation of the light assemblies of the present disclosure thus it improves and expediates the assembly process of a ceiling assembly.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on,” “engaged to,” “connected to,” or “coupled to” another element or layer, it may be directly on, engaged, connected, or coupled to the other element or layer, or intervening elements or layers may be present. In contrast, when an element is referred to as being “directly on,” “directly engaged to,” “directly connected to,” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as “first,” “second,” and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A light fixture assembly comprising:

an elongated tray comprising a base comprising a first side, a second side and a first opening therethrough, said elongated tray further comprises a first longitudinally extending wall extending from the second side of the base and a second longitudinally extending wall extending from the second side of the base, said first longitudinally extending wall having a first coupler, said second longitudinally extending wall having a second coupler;

a light assembly;

a coupling assembly coupling the light assembly to the tray, said coupling assembly positioned around the opening and adjacent to the second side around the first opening; and a baffle coupled within the coupling assembly, the baffle comprising a lower edge coplanar and flush with the base.

2. The light fixture assembly of claim 1 wherein the base comprises a component opening therethrough, the component opening has disposed therein or therethrough a wireless node, a smoke detector, fire detector, a gas sensor, a humidity sensor, an occupancy sensor, a light sensor and a temperature sensor.

3. A ceiling system comprising:

a first cross member;

a second cross member spaced apart from and parallel to the first cross member;

a plurality of the light fixture assemblies of claim 1 coupled to the first cross member and the second cross member;

said first coupler coupling the light fixture assembly to the first cross member; and said second coupler coupling the light fixture assembly to the second cross member.

4. The ceiling system of claim 3 wherein the first cross member has a planar member, wherein said first side of the base is coplanar with the planar member.

5. The ceiling system of claim 3 wherein the first cross member has a planar member, wherein said first side is coplanar with the planar member and the lower edge of the baffle.

6. The ceiling system of claim 3 wherein the first coupler comprises a first wall extending from the first longitudinally extending wall and a second wall extending from the second wall.

7. The ceiling system of claim 3 further comprising a panel disposed adjacent to at least a first light fixture of the plurality of light fixtures.

8. The ceiling system of claim 7 wherein the panel comprises a component opening therethrough, the component opening has disposed therein or therethrough a wireless node, a smoke detector, fire detector, a gas sensor, a humidity sensor, an occupancy sensor, a light sensor and a temperature sensor.

9. The ceiling system of claim 7 wherein the panel comprise a surface coplanar and flush with the first side of the base.

10. The ceiling system of claim 9 further comprising a plurality of ceiling tiles coupled to the first cross member and the second cross member, the panel comprises a surface coplanar with the first side of the base.

11. A ceiling assembly comprising:

a first cross member;

a second cross member spaced apart from and parallel to the first cross member;

a plurality of light fixtures, each light fixture comprising, a first elongated tray comprising a base comprising a first side, a second side and a first opening therethrough, said elongated tray further comprises a first longitudinally extending wall extending from the second side of the base and a second longitudinally extending wall extending from the second side of the base, said first longitudinally extending wall having a first coupler coupled to the first cross member, the second longitudinally extending wall having a second coupler coupled to the second cross member;

a light assembly;

a coupling assembly coupling the light assembly to the tray, said coupling assembly positioned around the opening and adjacent to the second side around the first opening; and a baffle coupled within the coupling assembly, the baffle comprising a lower edge.

12. The ceiling assembly of claim 11 wherein the first side of the plurality of light fixtures are coplanar and flush with an adjacent one of the plurality of light fixtures.

13. The ceiling assembly of claim 11 further comprising a panel disposed between the first cross member and the second cross member, the panel comprising a panel base having a first surface and a second surface, said first surface being coplanar and flush with the first side of at least one of the plurality of light fixtures.

14. The ceiling assembly of claim 13 wherein the panel base comprises a panel opening therethrough, the panel opening has disposed therein or therethrough a wireless node, a smoke detector, fire detector, a gas sensor, a humidity sensor, an occupancy sensor, a light sensor and a temperature sensor.

15. The ceiling assembly of claim 14 wherein the first cross member comprises a first lower surface and second cross member comprises a second lower surface, the first lower surface, the second lower surface and the first side of the first elongated tray are coplanar.

16. The ceiling assembly of claim 15 further comprising a plurality of ceiling tiles, the first lower surface, the second lower surface and the first side of the first elongated tray and the ceiling tiles are coplanar.

17. The ceiling assembly of claim 11 further comprising a plurality of ceiling tiles, the first side of the first elongated tray and the ceiling tiles are coplanar.

18. The ceiling assembly of claim 11 wherein the base comprises a component opening therethrough, the component opening has disposed therein or therethrough a wireless node, a smoke detector, fire detector, a gas sensor, a humidity sensor, an occupancy sensor, a light sensor and a temperature sensor.

19. The ceiling assembly of claim 11 wherein the coupling assembly comprises a trim piece adjacent to the second side and disposed around the opening;

a support coupled to the trim piece; and a clamp coupling the trim piece and the support to the clamp so that the trim piece is disposed around the first opening.

20. The ceiling assembly of claim 19 wherein the support comprises an outer wall adjacent to an upper edge of the trim piece, the outer wall comprises a channel therethrough for receiving a fastener coupling the support to the trim piece, the trim piece comprises a first radially extending extension receiving the fastener.

* * * * *